Feb. 28, 1967  R. W. CASHMAN ETAL  3,306,076
AXIALLY ADJUSTABLE COUPLING

Filed Sept. 15, 1964  2 Sheets-Sheet 1

INVENTORS
ROBERT W. CASHMAN
ANTHONY WASCO, Jr
BY
Learman, Learman + McCulloch
ATTORNEYS INVENTORS
ROBERT W. CASHMAN
ANTHONY WASCO, Jr
BY
*Learman, Learman & McCulloch*
ATTORNEYS United States Patent Office 3,306,076
Patented Feb. 28, 1967

3,306,076
AXIALLY ADJUSTABLE COUPLING
Robert W. Cashman and Anthony Wasco, Jr., Saginaw, Mich., assignors to Saginaw Machine and Tool Company, Saginaw, Mich., a corporation of Michigan
Filed Sept. 15, 1964, Ser. No. 396,548
12 Claims. (Cl. 64—11)

This invention relates to coupling devices for engaging and disengaging a pair of rotatable members. More particularly the invention pertains to a coupling mechanism which is axially adjustable to effect engagement and disengagement between a driving member and a driven member.

In the use of precision turning, boring, and grinding machinery it is customary to mount a workpiece in a chuck that is supported at one end of a rotatable spindle and to impart rotation to the workpiece by rotating the spindle. Some of these machines include multiple spindles that are supported on a turret or table which can be rotated or indexed through a plurality of positions or stations at which successive operations may be performed on the workpieces. In some machines of the kind referred to, each spindle is permanently connected to its own driving motor, whereas in other machines each spindle may be coupled to and uncoupled from a fixed driving motor located at a work station. In either case, it is desirable that as little vibration as possible be transmitted from the driving motor to the workpiece supporting spindle, for the reason that such vibration has an adverse effect on the finished workpiece. In those instances where a machine is provided with a spindle driving motor permanently located at each work station and wherein the spindles are advanced in succession from one station to another for successive coupling to the motors, it is not uncommon for a particular spindle to be subjected to varying amounts of vibration. This is partially due to inherent differences in the successive driving motors themselves and partly due to differences, no matter how slight, in the positions in which the successive motors are mounted. For example, it is practically an impossibility to mount two adjacent motors in such positions that a spindle may be coupled in succession to each motor in an identical manner. Consequently, any misalignment between the motor shaft and the spindle produces undesirable vibration or strain on the latter.

In the use of machinery of the class described, it is frequently necessary for the speed of rotation of the workpiece to be varied in accordance with the type of operation being performed on it and in accordance with the rotational speed of the particular area of the workpiece being treated. In such instances it is desirable that the spindle on which the workpiece is supported be capable of being driven selectively by any one of a number of different speed motors, thereby enabling optimum speeds to be imparted to a workpiece without the expense of having to provide variable speed motors and associated equipment.

In addition to the foregoing, it is advantageous to provide a severable connection between a workpiece supporting spindle and its driving motor so as to minimize the risk of damaging the spindle, the motor, or the cutting or grinding tools, in the event of a jam or other irregularity. Heretofore, the use of shear pins and similar couplings have been used for this purpose, but it has been a difficult and often laborious task to replace a sheared coupling pin or the like.

An object of this invention is to provide a coupling device for separably coupling a spindle or the like to any selected one of a plurality of driving motors.

Another object of the invention is to provide a coupling of the kind referred to which is inherently separable from its driving motor and which does not cause destruction of any parts of the coupling in case of forcible separation.

Another object of this invention is to provide a coupling for a driven spindle and which is capable of transmitting torque only to the spindle.

Another object of the invention is to provide a spindle coupling device which is capable of coupling a spindle to a slightly misaligned driving shaft and in such manner as to avoid the imposition of radially or laterally directed strains or forces on the spindle.

A further object of the invention is to provide a spindle coupling device of the kind referred to and which is axially adjustable so as to enable rapid coupling and uncoupling of the spindle with a driving motor.

Another object of the invention is to provide an axially adjustable coupling device for a rotatable spindle and in which means is provided for guiding the coupling to a truly concentric relationship with the spindle.

Other objects and advantages of the invention will be pointed out specifically or will become apparent from the following description when it is considered in conjunction with the appended claims and the accompanying drawings, in which:

Figure 1:
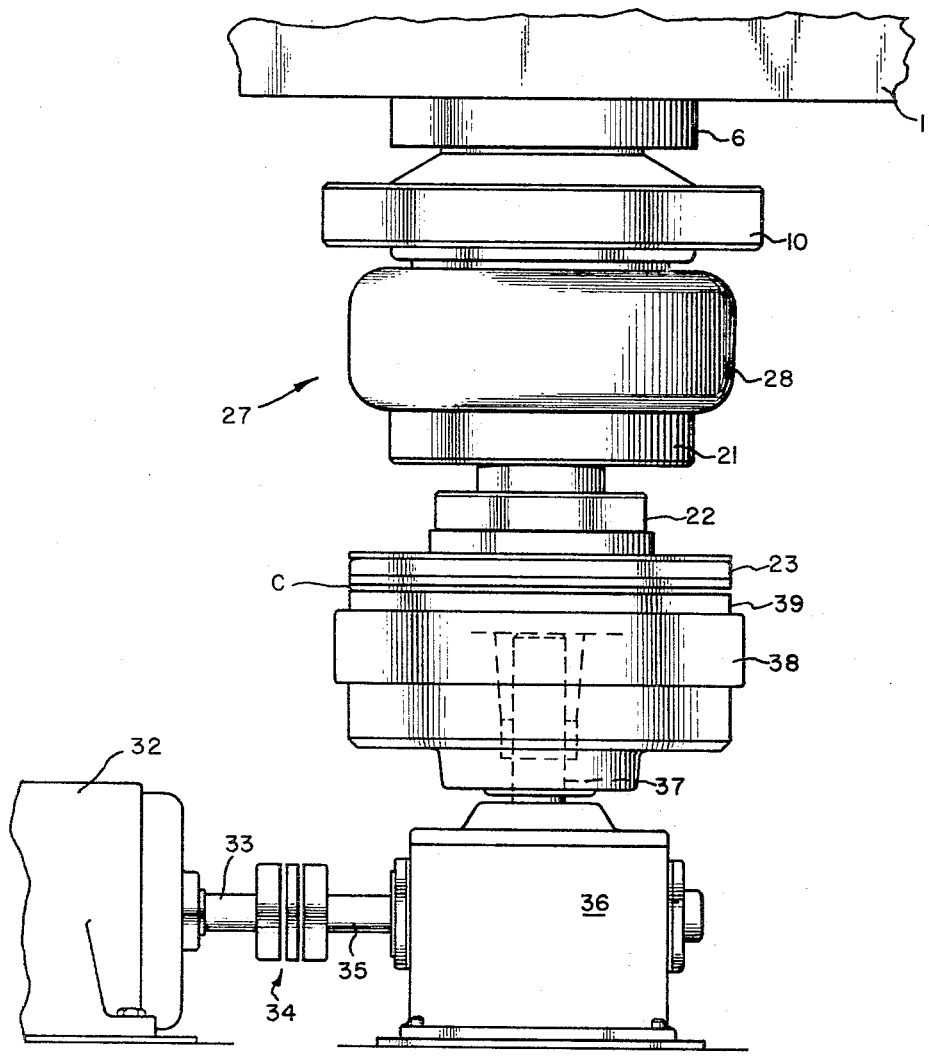
FIGURE 1 is a fragmentary, side elevational view of a spindle coupling assembly constructed in accordance with the invention and in position to be coupled to a motor driven, magnetic clutch of conventional construction.
Figure 2:
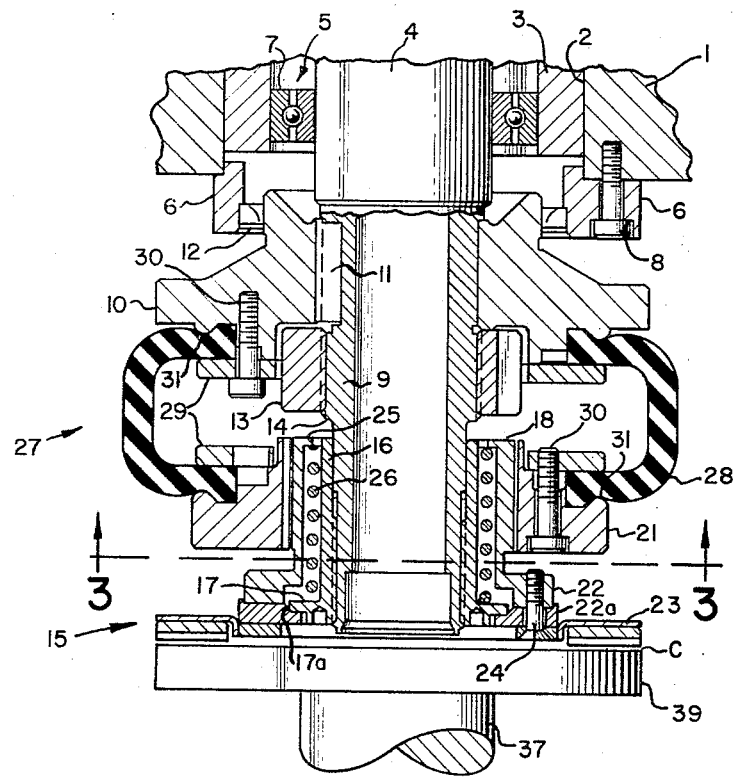
FIGURE 2 is an enlarged, vertical sectional view of the coupling apparatus.
Figure 3:
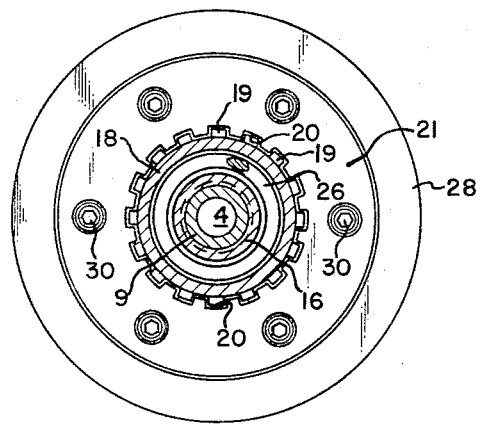
FIGURE 3 is a transverse sectional view taken on the line 3—3 of FIGURE 2.

Apparatus constructed in accordance with the invention is adapted for use in conjunction with a table or support 1 which is mounted by suitable means (not shown) for rotation. Although any one of a number of different kinds of mounting means may be utilized with the table 1, the latter could be mounted in the manner disclosed in copending application Serial No. 276,945, filed April 30, 1963. Openings 2 are formed in the table 1 at suitable intervals around the latter and in each of which is fixed a sleeve 3 within which is mounted a rotatable member or spindle 4 at the upper end of which may be mounted a chucking device (not shown) of known construction. The spindle may be rotatably mounted in the table 1 by suitable bearing assemblies 5 including a plurality of balls 7. Secured to the housing 1 by a number of bolts, one of which is shown at 8 in FIGURE 2, is a seal retainer 6. The arrangement is such that the spindle 4 is suspended from the table 1, the spindle having a preferably hollow, lower extension 9 which depends from the table 1. If desired, the spindle assembly may be rotatably mounted in the support 1 in the manner disclosed in Patent No. 3,149,852.

An annular driven member 10 is suitably fixed to the spindle extension 9 by means of a key 11. Preferably, an annular seal 12 is interposed between the driven member 10 and the retainer 6. The arrangement is such that rotation of the member 10 is imparted to the spindle extension 9 so as to effect rotation of the spindle 4. The driven member 10 is maintained in axially fixed relation on the spindle extension 9 by means of a threaded nut 13 which is removably positioned on a correspondingly threaded enlargement 14 provided on the extension 9.

Coupling means designated generally by the reference character 15 is associated with the spindle 4 and comprises an interiorly threaded sleeve 16 that is threaded on the terminal end of the extension 9. The lower end of the sleeve 16 is provided with a laterally turned guide flange 17 for a purpose presently to be explained.

The coupling means 15 also includes a tubular spline shaft 18 that is freely rotatable relatively to the member 9 and having parallel, external, axially extending teeth 19 that are slideably received in grooves 20 formed in an annular clamp ring 21. The lower end of the shaft 18 is provided with a radial flange 22 to which a mounting ring 22a is secured by suitable means such as screws 24. The ring 22a has an inclined guide surface 17a which normally is engaged by the guide flange 17. Fixed to the ring 22a is a magnetically attractive, driving member or clutch plate 23 of known construction. The construction and arrangement of the parts of the coupling means described thus far are such that rotation of the driving plate 23 is imparted to the clamp ring 21 via the shaft 18, and the shaft 18 is axially adjustable relatively to the clamp ring 21.

Preferably, the upper end of the shaft 18 is provided with a radially inturned flange 25 against which one end of a compression spring 26 seats. The other end of the spring 26 seats against the flange 17 and, therefore, the spring constantly exerts a force on the shaft 18 tending to urge it and the clutch plate 23 upwardly.

Axially extensible and contractile torque transmitting means 27 interconnects the coupling means 15 and the driven member 10 for transmitting rotation only to the spindle 4. The torque transmitting means comprises an annular, flexible rubber or the like boot 28, substantially U-shaped in cross-section, and having its opposite edges clamped to the members 10 and 21, respectively. In each instance, the edge of the boot is clamped by an annular ring 29 that is removably secured to its associated member by bolts 30. Preferably, each of the members 10 and 21 is provided with an annular retaining rib 31 which bears against the associated edge of the boot 28 to assist in clamping the latter.

The torque transmitting means 27 is so constructed that it enables axial movement of the shaft 18 relative to the driven member 10. In any position of axial adjustment, however, the interengagement between the shaft 18 and the clamp member 21 will enable rotation of the driving plate 23 to be imparted via the boot 28 to the driven member 10, and through the key 11, to the spindle 4. Vibrations and lateral forces which may be imposed on the clutch plate 23, however, will not be transmitted through the boot 28 to the spindle 4, inasmuch as the boot is flexible.

Any one of a large number of known power devices may be utilized for effecting rotation of the driving member 23. In the disclosed embodiment the power apparatus comprises a conventional electric motor 32 having an armature shaft 33 that is connected by a clutch 34 to the input shaft 35 of a conventional speed reduction unit 36. The speed reducer 36 has an output shaft 37 on which may be fixed an energizable and deenergizable electromagnetic clutch of known construction and having a magneticaly attractive disk or plate 39 which, when energized, is capable of attracting the clutch plate 23.

To condition the apparatus for operation, the electromagnetic clutch 38 is mounted in such position that a clearance C normally exists between the plates 23 and 39, thereby enabling rotation of the table 1 to effect movement of the plate 23 across the plate 39. Rotation of the table 1 will enable the clutch plate 23 to be moved to a position in substantial alignment with the clutch disk 39. In these positions of the parts, the electromagnetic clutch 38 may be energized in a well-known manner so as to attract to the disk 39 the clutch plate 23 and magnetically couple the clutch disks 23 and 39. When the clutch plates are so coupled, rotation of the shaft 37 by the motor 32 will effect rotation of the spindle 4.

In order for the clutch plate 23 to engage the clutch disk 39, it is necessary that the shaft 18 move axially of the spindle 4 a distance corresponding to the clearance C. Such movement of the shaft 18 will effect disengagement between the guides 17 and 17a. When the electromagnetic clutch 38 is deenergized, however, the magnetic bond between the clutch plates will be broken thereby enabling the spring 26 to restore the clutch plate 23 to an elevated position. As the clutch plate 23 moves upwardly, the guides 17 and 17a will react with one another to restore the shaft 18 and its associated parts to a concentric relationship with the spindle 4.

The construction and arrangement of the apparatus are such that the spindle 4 may be coupled and uncoupled from any one of a large number of different driving motors, thereby enabling the spindle to be driven at any speed. In each instance, however, only torque will be transmitted to the spindle. Moreover, inasmuch as the connection between the spindle and the driving motor is magnetic, any jam or other cause for retarding rotation of the spindle will enable the magnetic connection to be severed without damage to any of the parts. Furthermore, the flexible boot 28 will act as a cushion or shock absorber in the event of a jam, thereby minimizing the disk of injury to the workpiece or the cutting or grinding apparatus.

The disclosed embodiment is representative of a presently preferred form of the invention, but is intended to be illustrative rather than definitive thereof. The invention is defined in the claims.

We claim:
1. An axially adjustable coupling for a rotatable member comprising a driven member having means for connecting it to said rotatable member; axially extensible and contractile torque transmitting means connected to said driven member for transmitting rotation thereto; driving means; means mounting said driving means for rotation and axial movement relative to said driven member; and axially adjustable coupling means secured to said driving means and said torque transmitting means for rotating the latter.

2. An axially adjustable coupling for a rotatable member comprising a driven member having means for connecting it to said rotatable member; axially extensible and contractile torque transmitting means secured to said driven member for transmitting rotation thereto; coupling means connected to said torque transmitting means for rotating the latter; and means mounting said coupling means on said rotatable member for rotary and axial movements relative thereto.

3. An axially adjustable coupling for a rotatable member comprising a driven member having means for connecting it to said rotatable member; axially extensible and contractile torque transmitting means secured to said driven member for transmitting rotation thereto; driving means; means mounting said driving means on said rotatable member for axial and rotating movements relative thereto; and flexible coupling means connecting said driving means to said torque transmitting means for rotating the latter.

4. An axially adjustable coupling for a rotatable member comprising a driven member having means for connecting it to said rotatable member; axially extensible and contractile torque transmitting means connected to said driven member for transmitting rotation thereto; a driving member freely rotatable relatively to said rotatable member; coupling means connecting said driving member to said torque transmitting means for rotating the latter; means mounting said coupling means for axial movements relative to said torque transmitting means; and guide means reacting between said coupling means and said driving member for guiding the latter in its axial movements.

5. An axially adjustable coupling for a rotatable member comprising a driven member having means for connecting it to said rotatable member; axially extensible and contractile torque transmitting means connected to said driven member for transmitting rotation thereto; a driving member; coupling means connecting said driving member to said torque transmitting means for rotating the latter; means mounting said coupling means for axial movements relative to said torque transmitting means; guide means reacting between said coupling means and said driving member for guiding the latter in its axial movements; and yieldable means reacting between said coupling means and said driving member for constantly urging the latter in one direction of axial movement.

6. An axially adjustable coupling for connecting and disconnecting a rotatable member to and from a magnetic clutch, said coupling comprising a driven member having means for connecting it to said rotatable member; axially extensible and contractile torque transmitting means connected to said driven member for transmitting rotation thereto; a driving, magnetically attractive member; means mounting said driving member for rotation relative to said driven member and for axial movement in opposite directions into and out of driving engagement with said clutch; and means connecting said driving member to said torque transmitting means for rotating the latter.

7. An axially adjustable coupling for connecting and disconnecting a rotatable member to and from a magnetic clutch, said coupling comprising a driven member having means for connecting it to said rotatable member; axially extensible and contractile torque transmitting means connected to said driven member for transmitting rotation thereto; a driving, magnetically attractive member; means mounting said driving member for axial movement in opposite directions into and out of driving engagement with said clutch; means connecting said driving member to said torque transmitting means for rotating the latter; and yieldable means reacting between said mounting means and said driving member for constantly urging the latter in a direction to disengage said driving member and said clutch.

8. An axially adjustable coupling for connecting and disconnecting a rotatable member to and from a magnetic clutch, said coupling comprising a driven member having means for connecting it to said rotatable member; axially extensible and contractile torque transmitting means connected to said driven member for transmitting rotation thereto; a driving, magnetically attractive member; means mounting said driving member for axial movement in opposite directions into and out of driving engagement with said clutch; means connecting said driving member to said torque transmitting means for rotating the latter; and guide means reacting between said driving member and said mounting means for guiding said driving member in its axial movements.

9. An axially adjustable coupling for connecting and disconnecting a rotatable member to and from a magnetic clutch, said coupling comprising a driven member having means for connecting it to said rotatable member; axially extensible and contractile torque transmitting means connected to said driven member for transmitting rotation thereto; a driving, magnetically attractive member; means mounting said driving member for axial movement in opposite directions into and out of driving engagement with said clutch; means connecting said driving member to said torque transmitting means for rotating the latter; guide means reacting between said driving member and said mounting means for guiding said driving member in its axial movements; and yieldable means reacting between said mounting means and said driving member for constantly urging the latter in a direction to disengage said driving member and said clutch.

10. An axially adjustable coupling for connecting and disconnecting a rotatable member to and from a magnetic clutch, said coupling comprising a driven member having means for connecting it to said rotatable member; axially extensible and contractile torque transmitting means connected to said driven member for transmitting rotation thereto; a driving, magnetically attractive member; tubular means of such size as freely to receive said rotatable member; a magnetically attractive clutch plate carried by said tubular member for engagement and disengagement with said clutch; and axially slideable means connecting said tubular member to said torque transmitting means.

11. The construction set forth in claim 10 including spring means acting on said tubular member and constantly urging the latter in one direction of axial adjustment.

12. The construction set forth in claim 11 including guide means acting on said clutch plate for guiding the latter in its axial movements.

References Cited by the Examiner

UNITED STATES PATENTS

| | | | |
|---|---|---|---|
| 750,370 | 1/1904 | Kammerer | 192—84 |
| 1,013,786 | 1/1912 | Lambert | 64—12 |
| 1,322,119 | 11/1919 | Kiwul | 64—29 |
| 2,174,168 | 9/1939 | Rattray | 64—27 X |
| 2,648,598 | 8/1953 | Schlotmann | 64—13 |
| 2,944,866 | 7/1960 | Moseley | 64—13 X |
| 2,955,692 | 10/1960 | Thomas | 192—84 |
| 2,977,777 | 4/1961 | Bernitz | 64—23 |

FOREIGN PATENTS 1,015,258  7/1952  France.

FRED C. MATTERN, Jr., Primary Examiner.

HALL C. COE, Examiner.